Patented Apr. 1, 1924.

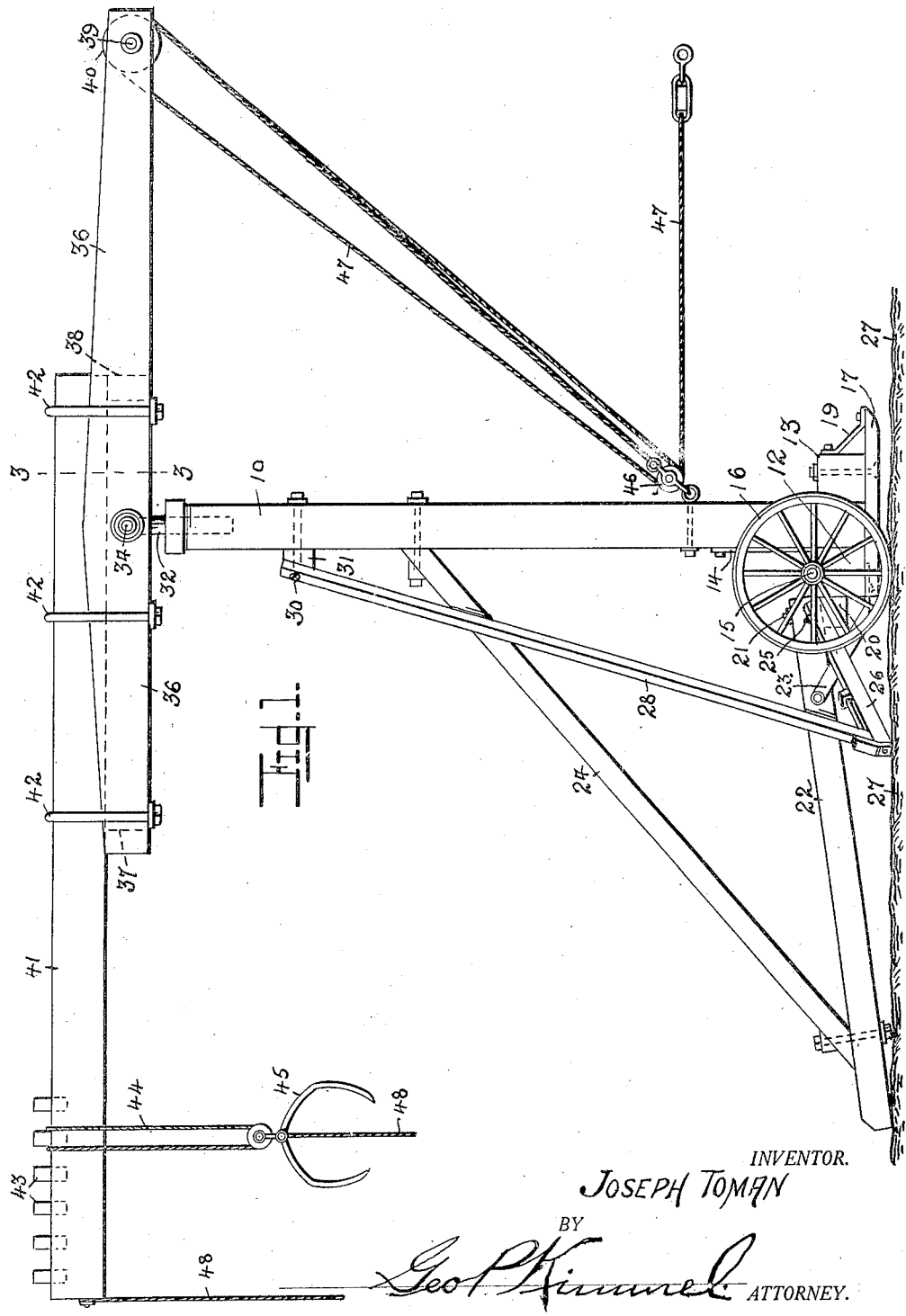

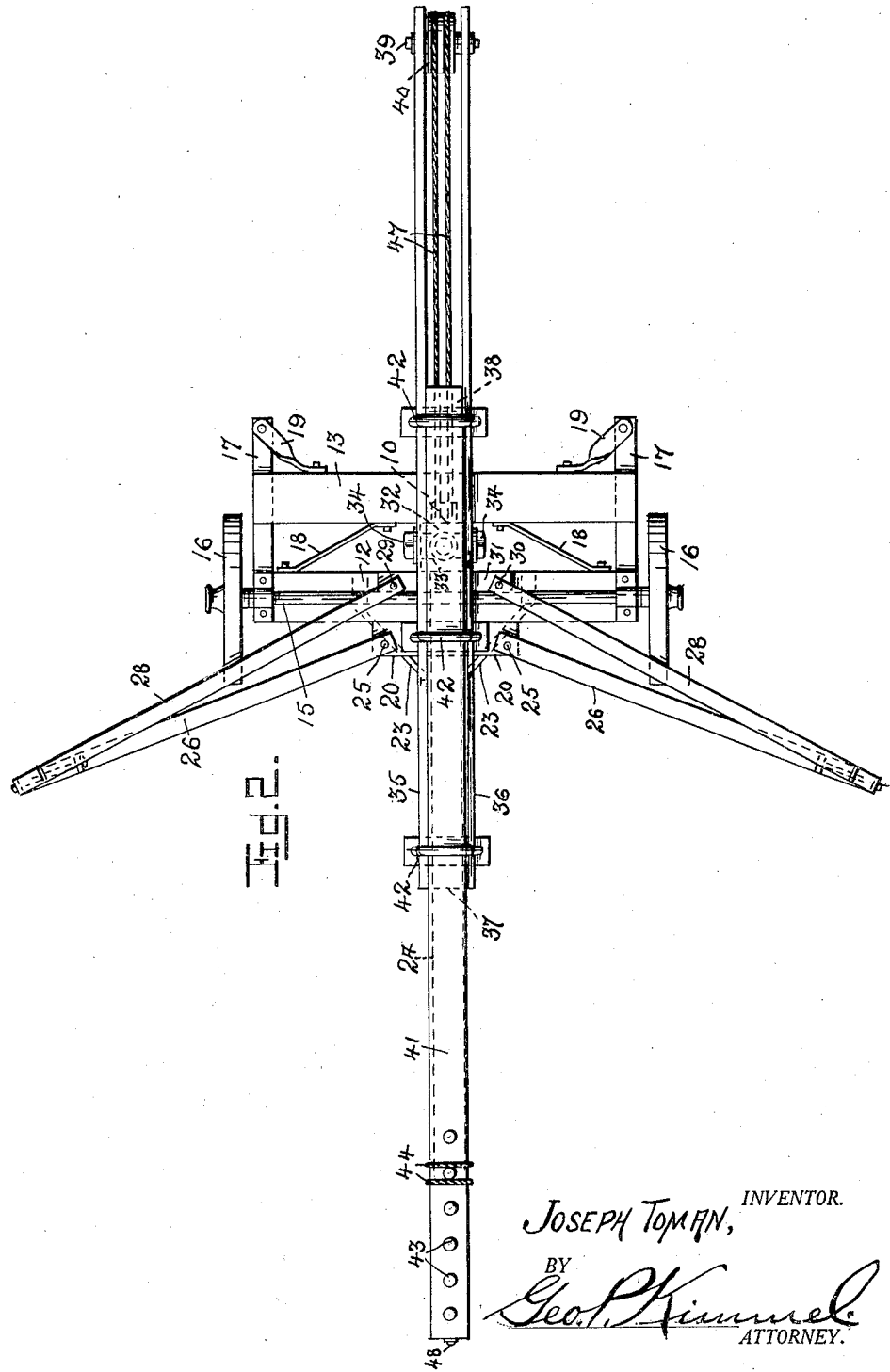

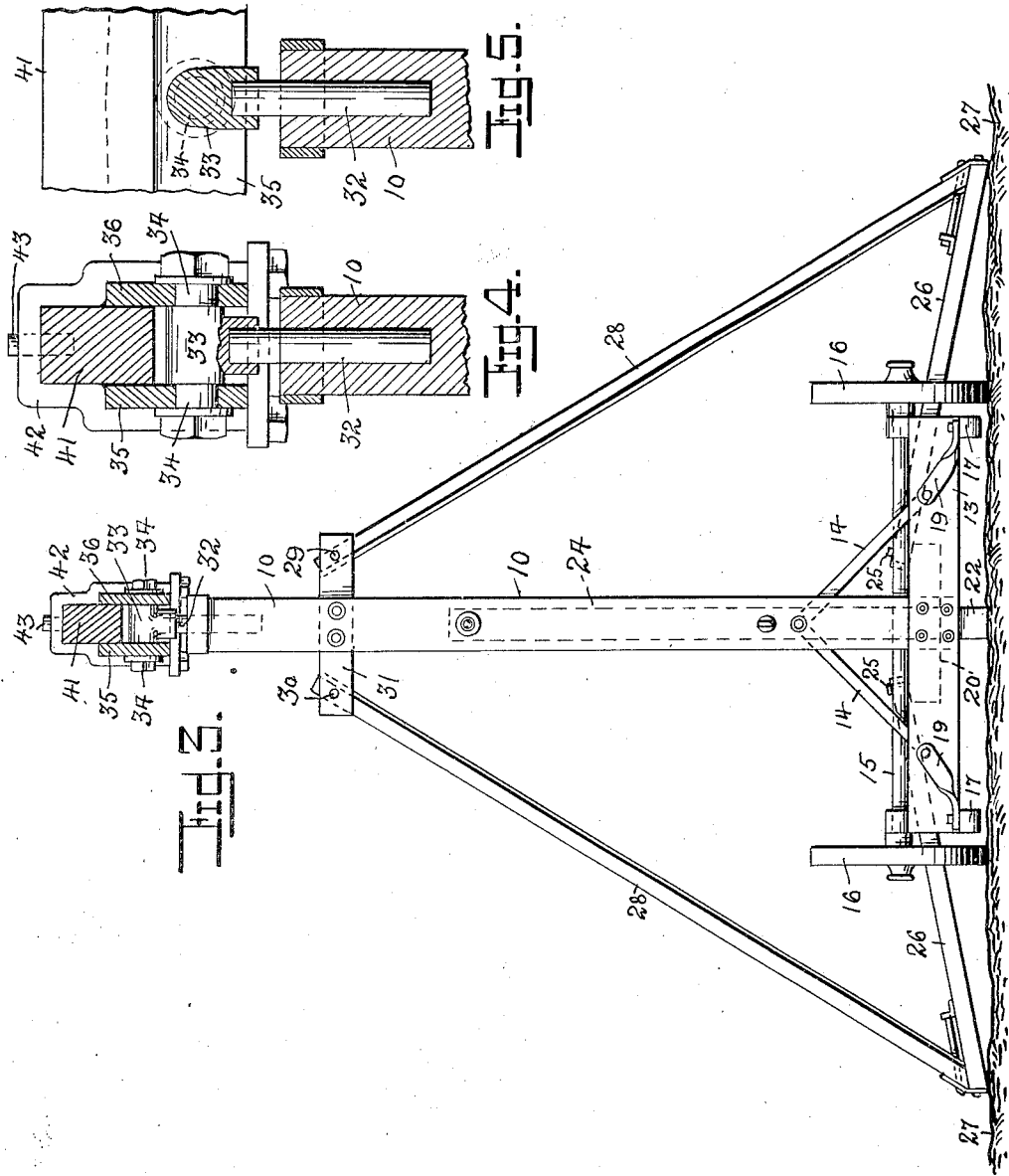

1,489,174

UNITED STATES PATENT OFFICE.

JOSEPH TOMAN, OF ST. PAUL, NEBRASKA.

HAY LOADER.

Application filed October 25, 1922. Serial No. 596,863.

*To all whom it may concern:*

Be it known that I, JOSEPH TOMAN, a citizen of the United States, residing at St. Paul, in the county of Howard and State of Nebraska, have invented certain new and useful Improvements in Hay Loaders, of which the following is a specification.

This invention relates to devices adapted for use in loading hay and the like from stacks, or for transferring hay and like products from wagons or from the ground to the stacks, and has for one of its objects to simplify the construction and increase the efficiency and utility of devices of this character.

Another object of the invention is to provide a device of this character which may be reduced in size for transportation or storage.

Another object of the invention is to provide a device of this character which may be readily moved from place to place as required, and thus adapted to the locality where it is to be employed.

With these and other objects in view the invention consists in certain novel features of construction as hereinafter shown and described and then specifically pointed out in the claims, and in the drawings illustrative of the preferred embodiment of the invention:—

Figure 1 is a side elevation, and—

Figure 2 is a plan view, of the improved device.

Fig. 3 is a front elevation, with the "boom" portion in section on the line 3—3 of Fig. 1, looking in the direction of the arrow.

Figs. 4 and 5 are enlarged sectional details illustrating the construction of the coupling between the boom and the mast.

The improved apparatus comprises a mast 10 of suitable strength and length and attached as by bolts or other suitable devices at its lower end between transverse members 12 and 13, and preferably supported by braces 14. An axle 15 is mounted on the transverse member 12 and provided with carrier wheels 16, and "shoe" members 17 are attached to the under faces of the members 12 and 13 and extend in advance of the member 13 and are sled formed to facilitate the moving of the apparatus over the ground when the wheels 16 are detached, or when the apparatus is to be moved for relatively short distances, as when moved around the stack or the like.

The transverse members 12 and 13 are reinforced by diagonal braces 18, and the shoe members 17 are likewise supported by braces 19 from the member 13.

Attached to the rear face of the sill member 13 is a block 20 having the upper face at the ends bevelled, and attached at 21 to the upper face of the block at the center is a trailer beam 22, the latter preferably supported from the member 12 by oblique braces 23, and likewise supported from the mast 10 by a brace 24.

Swinging at 25 upon the bevelled faces of the block 20 are stay members 26 which rest by their outer ends upon the ground, indicated at 27, at each side of the apparatus, and are supported in projected position by braces 28 swingingly coupled by bolts 29 and 30 respectively to transverse member 31 attached to the mast 10. The stay members 26 together with the braces 28 operate to support the mast from lateral displacement, and are foldable against the trailer member when not in use, or when the apparatus is to be bodily transported.

Supported in the upper end of the mast 10 is a relatively heavy pin 32, and rotative on this pin is a T-head member 33 having a socket in the vertical leg to engage over the pin and with journals 34 at the ends of the horizontal leg. Swinging upon the journals 34 and intermediate their ends are spaced main boom members 35 and 36, the latter connected at one end by a chock member indicated at 37 and likewise connected intermediate their ends by another chock member indicated at 38.

Extending through the boom members 35 and 36 at the ends opposite to the chock 37 is a bolt 39 carrying a cable sheave 40.

The main boom members 35 and 36 are widened vertically intermediate their ends at the point where the trunnions 34 are located, and bearing upon the chock members 37 and 38 is an extension boom member 41, the latter being rigidly coupled to the members 35 and 36 by a plurality of specially formed U-bolts or clips 42. The extension boom member 41 bears between the widened portions of the members 35 and 36 and is supported from lateral displacement thereby. Projecting from the upper face of the member 41 is a plurality of spaced stop pins 43 to adjustably hold a suspension cable device 44 upon the boom. A hay fork of suitable construction, represented conventionally at 45, is suspended from the cable member 44, and the latter may be lengthened or shortened as required, to control the distance between the extension boom and the fork.

Attached to the mast member 10 near the lower end, is a cable guide sheave 46, the sheaves 40 and 46 adapted to receive an operating cable 47 to which a draft team or other power is adapted to be applied to actuate the boom members.

Ordinarily the mast member 10 will be about twelve feet long, the main boom members 35 and 36 about seven or eight feet long at one side of the journals 34, and ten feet long at the other side of the journals.

The extension boom 41 is about twenty feet long and overlaps the main boom member about four and one-half feet, the trailer member 22 is about fourteen feet long, but these proportions may be varied as required.

A releasing line 48 is attached at one end to the fork 45 and at the other end to the boom extension 41, so that the same line may be utilized to release the fork and swing the boom horizontally on its pivot pin 32.

When the apparatus is to be employed it is moved upon its wheels 16 alongside of the stack from which the load is to be removed and the braces 26 turned laterally and bearing on the ground to "hold" the apparatus in position.

The wagon, truck, or other vehicle to be loaded is located in proper position relative to the sweep of the boom extension. The fork 45 is then engaged in the usual manner with its load on the stack and the team or other power applied to the cable 47 to draw the shorter portion of the coupled boom members downwardly and correspondingly elevate the fork carrying end together with the load of the fork.

The pull of the horses on the cable 47 automatically draws the boom around to dispose the load above the vehicle and when in proper position the man on the stack pulls the cable 48 to trip the fork and desposit the load on the vehicle, and then, draws the boom and the empty fork back into position above the stack, and the operation repeated.

The improved apparatus is simple in construction, can be constructed of any suitable material either wood or metal or a combination of wood and metal and of any required size and capacity.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1. In an apparatus of the class described a mast supported by transverse members, a bearing block connected to one of said transverse members, a trailer member connected to said block, stay members hingedly connected at one end to said block and adapted to be projected laterally therefrom and engaging the ground at opposite sides, and brace members swingingly connected at one end to said stay members and swingingly connected at the other end relative to said mast.

2. In an apparatus of the class described a mast supported by transverse members, a supporting member connected to said mast and extending transversely of the same, a bearing block connected to one of said transverse members, a trailer member connected to said block, stay members hingedly connected at one end to said block and adapted to be projected laterally therefrom and engaging the ground at opposite sides, and brace members swingingly connected at one end to said stay members and swingingly connected at the other end relative to said supporting member.

3. In an apparatus of the class described, a mast supported by transverse members, a main boom comprising spaced members, means for swivelly coupling said main boom to said mast, an extension boom attached to said main boom and having a plurality of stop pins in spaced relation, and a suspension cable engaging said extension boom and adjustably supported thereon by said spaced pins, said suspension cable adapted to support a hay fork device.

In testimony whereof, I affix my signature hereto.

JOSEPH TOMAN.